United States Patent [19]

Yamauchi et al.

[11] 4,185,297
[45] Jan. 22, 1980

[54] COLOR SEPARATION OPTICAL SYSTEM FOR COLOR TELEVISION CAMERA

[75] Inventors: Toshiro Yamauchi, Omiya; Takemi Saito, Kawagoe; Shigehiro Kanayama, Omiya, all of Japan

[73] Assignee: Fuji Photo Optical Co., Ltd., Omiya, Japan

[21] Appl. No.: 883,195

[22] Filed: Mar. 3, 1978

[30] Foreign Application Priority Data

Mar. 11, 1977 [JP] Japan .................... 52-26732

[51] Int. Cl.$^2$ .............. H04N 9/08; G03B 3/00; G03B 13/02
[52] U.S. Cl. ................ 358/55; 352/140; 354/195
[58] Field of Search .............. 358/50, 55, 227; 354/195, 196; 352/140; 350/255; 335/210

[56] References Cited

U.S. PATENT DOCUMENTS

| | | | |
|---|---|---|---|
| 3,126,446 | 3/1964 | Blancha | 358/55 |
| 3,681,521 | 8/1972 | Doi et al. | 358/55 |
| 3,915,557 | 10/1975 | Shimojima | 350/255 XR |
| 3,973,231 | 8/1976 | Saito et al. | 335/210 |
| 4,021,821 | 5/1977 | Peterson | 354/25 |
| 4,058,827 | 11/1977 | Ando et al. | 358/55 |

FOREIGN PATENT DOCUMENTS

983463 2/1965 United Kingdom ........... 358/55

*Primary Examiner*—Richard Murray
*Assistant Examiner*—Aristotelis M. Psitos
*Attorney, Agent, or Firm*—Gregor N. Neff; Harold L. Stults

[57] ABSTRACT

In a color television camera, a color separation optical system includes a first relay lens behind a taking lens of the camera, color separation optical elements such as prism blocks or dichroic mirrors, and a set of second relay lenses. Image pick-up tubes for three colors are provided behind the second relay lenses. The pick-up tubes are mounted in coil assemblies. Each coil assembly is provided with a rotating device for conducting a position adjustment of the tube with respect to the associated second relay lens to make perfect registration between images of the three tubes. A focus adjusting device for conducting a focus adjustment between each second relay lens and the associated image pick-up tube is provided in each second relay lens. The focus adjusting devices are operable from outside the camera for sliding the second relay lenses in the direction of their optical axes.

9 Claims, 3 Drawing Figures

COLOR SEPARATION OPTICAL SYSTEM FOR COLOR TELEVISION CAMERA

BACKGROUND OF THE INVENTION

1. Field of the Invention

This invention relates to a color separation optical system for a color television camera, and more particularly to an improvement in a color separation optical system for a color television camera of the relay lens type.

2. Description of the Prior Art

A color separation optical system for a color television camera of the so called relay lens type includes a relay lens system between the taking lens and the image pickup tubes of the camera. The relay lens system divides an image of the object of the camera focused by the taking lens into three color images of red, green and blue. The three color images are then focused on the three image pick-up tubes. The relay lens system comprises a single first relay lens, color separation optical elements such as prism blocks or dichroic mirrors, and three second relay lenses, one for each of the three color images. In the color separation optical system of the relay lens type as described above, two color images are obtained by reflection and one color image is obtained by transmission from the color separation optical elements, and it is possible to make the optical axes of the two second relay lenses for the two color images obtained by reflection parallel to the optical axis of the other second relay lens for the other color image obtained by transmission. Therefore, it is possible to orient the three color tubes in parallel to each other and accordingly to make the size of the television camera compact and avoid the influence of terrestrial magnetism on the tubes.

The image pick-up tubes employed in the color television camera in combination with the color separation optical system are incorporated in coil assemblies so that the focus control and the deflection and scanning of the electron beams thereof may be conducted thereby. In combining the pick-up tubes with the color separation optical system, it is necessary to precisely locate the tubes mounted in the coil assembly with respect to the focal planes of the color separation optical system. Further, it is also necessary to adjust the angular position of the pick-up tubes with respect to the color separation optical system by rotating the tubes together with the coil assemblies in order to obtain a precise registration between the three color images formed on the three tubes.

In order to make the above described control or adjustment, the coil assemblies including the image pick-up tubes are each supported by a coil assembly support means provided with a focusing means and a rotating means.

The above described coil assembly for the image pick-up tubes suffers from certain defects. Since it is very difficult to precisely adjust the position of the coil assembly because of the error in its outer diameter and since it has a comparatively large weight, the coil assembly support means is inevitably complicated in its structure and is large and expensive. Further, a coil assembly is necessary for each of the three color image pick-up tubes. Therefore, the coil assemblies provided with focusing means as well as rotating means are inevitably separated from each other by a distance larger than that optically required. In other words, the optical axes of the three tubes are separated from each other by a distance greater than that required for purely optical reasons. Consequently, the overall size of the color separation optical system becomes large.

SUMMARY OF THE INVENTION

The primary object of the present invention is, therefore, to provide a color separation optical system for a color television camera of small size and simple structure.

A specific object of the present invention is to provide a color separation optical system for a color television camera in which the coil assemblies are free of focusing means and accordingly are made compact in size and simple in structure.

Another object of the present invention is to provide a color separation optical system for a color television camera in which the focusing means for making a focus adjustment between the color separation optical system and the image pick-up tubes is provided in a relay lens of the color separation optical system and is operable from outside of the camera.

Still another object of the present invention is to provide a color separation optical system for a color television camera in which the distance between the optical axes of the three color image forming optical paths is reduced to make the overall size of the camera compact.

The above objects of the present invention are accomplished by providing a focusing means in the three second relay lenses of the color separating optical system comprising a single first relay lens, color separating optical elements and three second relay lenses. The focusing means functions to cause the three color images obtained by the color separation optical system to be precisely focused on the image pick-up tubes. In a preferred embodiment of the invention, the focusing means is made operable from outside of the camera so that the focus adjustment can be easily performed from the outside after the camera is assembled. In a further preferred embodiment, only two of the three second relay lenses are provided with the focusing means and the other is free of the focusing means to simplify the structure of the system. In this case, the optical relationship between the one of the second relay lenses not having a focusing means and the associated pick-up tube is preadjusted so that an image is precisely focused on the associated tube and the images on the other two tubes are focus controlled after the optical system is combined with the tubes.

DESCRIPTION OF THE PREFERRED EMBODIMENT

Figure 1:
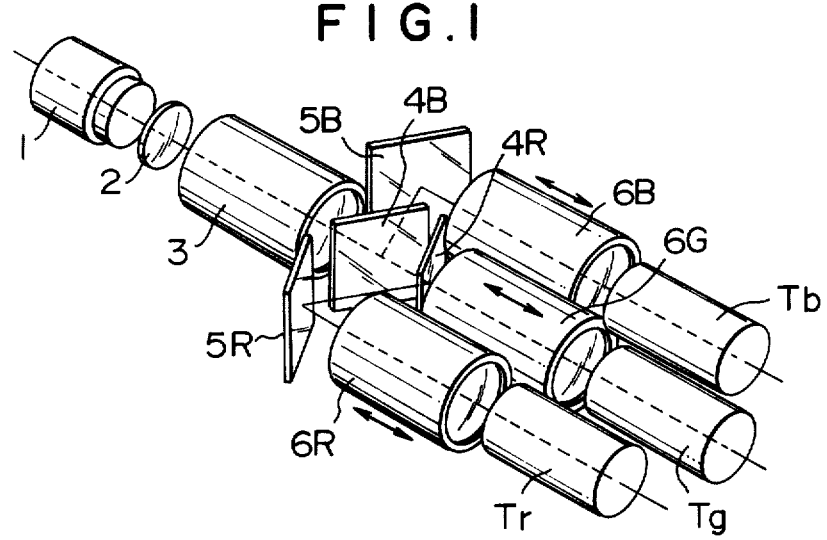
FIG. 1 is a perspective view of a color separation optical system for a color television camera in accordance with this invention, illustrated together with a taking lens and image pick-up tubes of the color television camera.

Referring to FIG. 1, the color separation optical system of this invention is provided between a taking lens 1 and three image pick-up tubes Tr, Tg and Tb. The optical system including the tubes and the color separation optical system of this invention comprises the taking lens 1, a field lens 2 located therebehind, a first relay lens 3 located behind the field lens, dichroic mirrors 4B and 4R located behind the first relay lens 3, mirrors 5B and 5R located in the optical paths of the light reflected by the dichroic mirrors 4B and 4R for reflecting the light from the dichroic mirrors 4B and 4R in the direction parallel to the light transmitting through the dichroic mirrors 4B and 4R, three second relay lenses 6R, 6G and 6B for three primary colors, and the three image pick-up tubes Tr, Tg and Tb located behind the second relay lenses 6R, 6G and 6B. The dichroic mirror 4B located immediately behind the first relay lens 3 is a blue-reflecting dichroic mirror and the dichroic mirror 4R located therebehind is a red-reflecting dichroic mirror which transmits green light. The mirror 5B is provided for reflecting the blue light reflected by the blue-reflecting dichroic mirror 4B, and the other mirror 5R is provided for reflecting the red light reflected by the red-reflecting dichroic mirror 4R.

The image of the object of the camera is first focused by the taking lens 1 on the field lens 2. The light is then collimated through the first relay lens 3 and passes through the dichroic mirrors 4B and 4R. Blue light is reflected by the blue-reflecting dichroic mirror 4B and is then reflected by the mirror 5B and passes through a second relay lens 6B for blue light to impinge upon a blue image pick-up tube Tb. Red light is reflected by the red-reflecting dichroic mirror 4R, reflected by the mirror 5R, passes through a second relay lens 6R and then impinges upon a red image pick-up tube Tr. Green light passing through the two dichroic mirrors 4B and 4R passes through a second relay lens 6G and then impinges upon a green image pick-up tube Tg.

Since the image pick-up tubes Tr, Tg and Tb are mounted in the color television camera by means of a simple mechanical mounting means, it is difficult to have the image pick-up tubes Tr, Tg and Tb precisely located on the focal planes of the second relay lenses 6R, 6G and 6B. Therefore, after the image pick-up tubes are mounted in the camera, it is necessary to make an optical adjustment between the tubes and the relay lenses. In accordance with this invention, this optical adjustment is conducted by moving the second relay lenses 6R, 6G and 6B in the direction of the optical axes as indicated by arrows in FIG. 1. The focus adjusting means to be provided in the second relay lenses can be of comparatively simple structure. This is because the second relay lenses 6R, 6G and 6B are optical elements and accordingly are of high dimensional accuracy and further because the weight of the second relay lenses is not so large as the image pick-up tubes.

Figure 2:
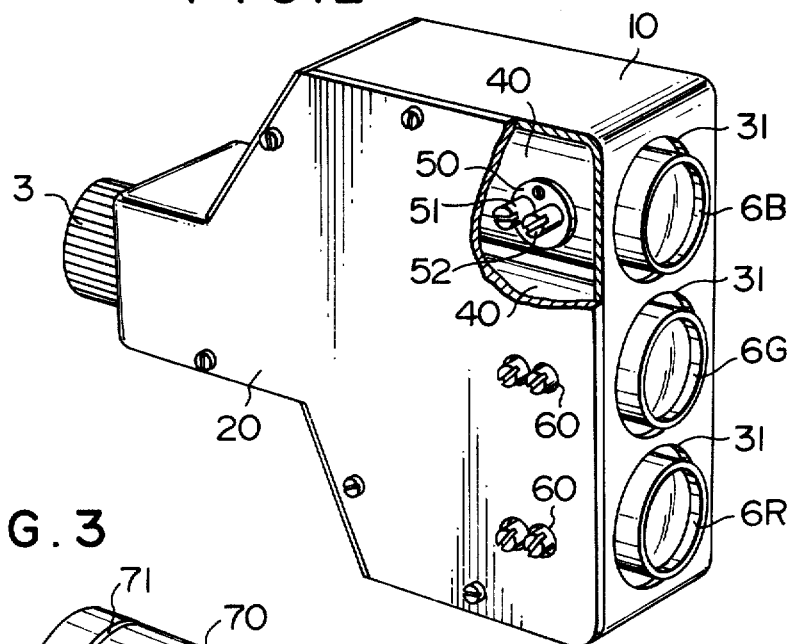
FIG. 2 is a partly broken away perspective view of a color separation optical system enclosed in a casing of a color television camera in accordance with an embodiment of the present invention.
Figure 3:
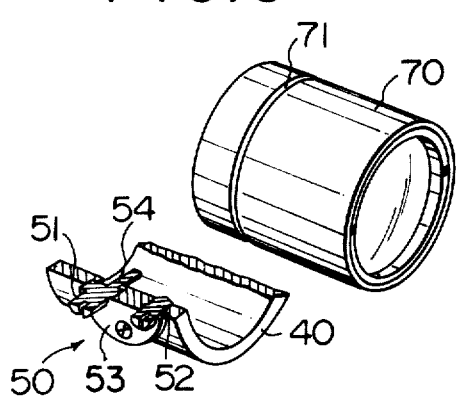
FIG. 3 is a perspective view, partly cut away, of a focusing means for a relay lens employed in the color separation optical system in accordance with the present invention.

FIG. 2 shows an embodiment of the color separation optical system incorporated in the casing of a color television camera in accordance with the present invention. In FIG. 2, a casing 10 contains therein three second relay lenses 6R, 6G and 6B with the rear ends thereof exposed from openings 31 provided at the rear face of the casing, color separating optical elements including mirrors and a first relay lens 3. A side cover 20 is removably mounted on the casing 10 by means of screws or the like. Three guide cylinders 40 are fixed to the casing 10 for guiding the second relay lenses 6R, 6G and 6B and allowing their sliding movement therein. The guide cylinders 40 are provided with focus adjusting means 50. As shown in detail in FIG. 3, the focus adjusting means 50 comprises a focus adjusting member 51 and a locking member 52 rotatably mounted on a seat plate 53 which is secured to the guide cylinder 40. The focus adjusting member 51 is a rotatable pin having an eccentrically projected end 54. The locking member 52 is a screw which is in threaded engagement with the seat plate 53. The lens barrel 70 of the second relay lens has on its periphery a groove 71 which is to be engaged with said end 54 projecting from the pin 51. Thus, rotating the pin 51 causes the eccentrically projected end 54 to rotate and thus to axially move the lens barrel 70 of the second relay lens for effecting the focus adjustment of the second relay lens. After the focus is adjusted, the locking member 52 is operated to hold the lens barrel 70 of the second relay lens. The cover 20 is provided with openings 60 through which the focus adjusting member 51 and the locking member 52 extend outward so that these members 51 and 52 can be operated from outside.

In accordance with the present invention as described above, the focus adjustment between the second relay lenses and the image pick-up tubes can be conducted by operating the focus adjusting means 50 on the optical system side. The coil assembly side including the image pick-up tubes is only required to be provided with rotating means.

Though the above described embodiment of the present invention is provided with a focus adjusting means 50 having pins 51 with eccentrically projected end 54, it should be understood that the focus adjusting member 51 may be of any shape or structure. For instance, a feed screw can be substituted therefor.

Further, it will be understood that one of the focus adjusting means 50 provided in the casing 10 may be omitted if the one second relay lens not provided with the focus adjusting means is made the standard and the other relay lenses are focus adjusted on basis of this standard second relay lens.

We claim:

1. A color separation optical system for a color television camera of the relay lens type provided between a taking lens and three image pick-up tubes in the camera, comprising a first relay lens, a color separating optical means located behind the first relay lens for dividing an optical path from the first relay lens into three parallel optical paths, and three second relay lenses located in the three optical paths, respectively, wherein the improvement comprises focus adjusting means provided in at least two of said three second relay lenses for moving the second relay lenses in the direction of the optical axes thereof with respect to the image pick-up tubes located therebehind.

2. A color separation optical system for a color television camera as defined in claim 1 wherein said focus adjusting means is provided in each of said three second relay lenses.

3. A color separation optical system for a color television camera as defined in claim 1 wherein said focus adjusting means is operable from outside the camera.

4. A color separation optical system for a color television camera as defined in claim 3 wherein said focus adjusting means comprises a control member projecting out of a casing in which said first relay lens, said color separation optical means and said second relay lenses are retained, whereby the control member is operable from outside the casing.

5. A color separation optical system for a color television camera as defined in claim 4 wherein said control member is a pin having an eccentrically projecting end which is engaged with a part of a lens barrel of the second relay lens.

6. A color separation optical system for a color television camera as defined in claim 5 wherein said part of the lens barrel is a groove extending in perpendicular to the optical axis of the second relay lens.

7. A color separation optical system for a color television camera as defined in claim 4 wherein said focus adjusting means further comprises a locking means for locking the position of the second relay lens after the focus is adjusted.

8. A device as in claim 1 including collimating means for collimating the light reaching said second relay lenses.

9. A device as in claim 8 in which said collimating means includes said first relay lens and a field lens ahead of said first relay lens.

* * * * *